United States Patent [19]

Konno et al.

[11] 3,800,092

[45] Mar. 26, 1974

[54] TELEPHONE AUTO-ANSWERING DEVICE

[75] Inventors: Akira Konno, Tokyo; Hiroshi Mizuno, Nagareyama, both of Japan

[73] Assignee: Pioneer Electronic Corporation, Tokyo, Japan

[22] Filed: June 4, 1971

[21] Appl. No.: 150,156

[30] Foreign Application Priority Data

June 5, 1970 Japan ............................... 45-48550

[52] U.S. Cl. ............................................... 179/6 R

[51] Int. Cl. ............................................ H04m 1/64

[58] Field of Search.......... 179/6 R, 6 AC, 6 C, 6 E, 179/100.2; 318/490, 474, 178, 180, 367, 368

[56] References Cited

UNITED STATES PATENTS

| | | | |
|---|---|---|---|
| 2,925,279 | 2/1960 | Fontaine | 179/6 R |
| 3,435,289 | 3/1969 | Aselman | 318/474 |
| 3,283,236 | 11/1966 | Legg | 318/474 |
| 3,509,824 | 5/1970 | Schmidly | 318/474 |
| 2,815,401 | 12/1957 | O'Dwyer | 179/6 R |

FOREIGN PATENTS OR APPLICATIONS

| | | | |
|---|---|---|---|
| 831,667 | 3/1960 | Great Britain | 318/490 |

*Primary Examiner*—Raymond F. Cardillo, Jr.
*Attorney, Agent, or Firm*—Sughrue, Rothwell, Mion, Zinn & Macpeak

[57] ABSTRACT

Disclosed is a telephone auto-answering device which includes an electric motor for moving a magnetic tape. Through a motor coil minute current, insufficient to rotate the motor, flows when the device is in a stand-by state, while rated current flows when it is desired to move the magnetic tape. A detecting circuit is provided for detecting the flow of current to cause the device not to perform its answering operation when neither the minute current nor rated current is detected.

3 Claims, 1 Drawing Figure

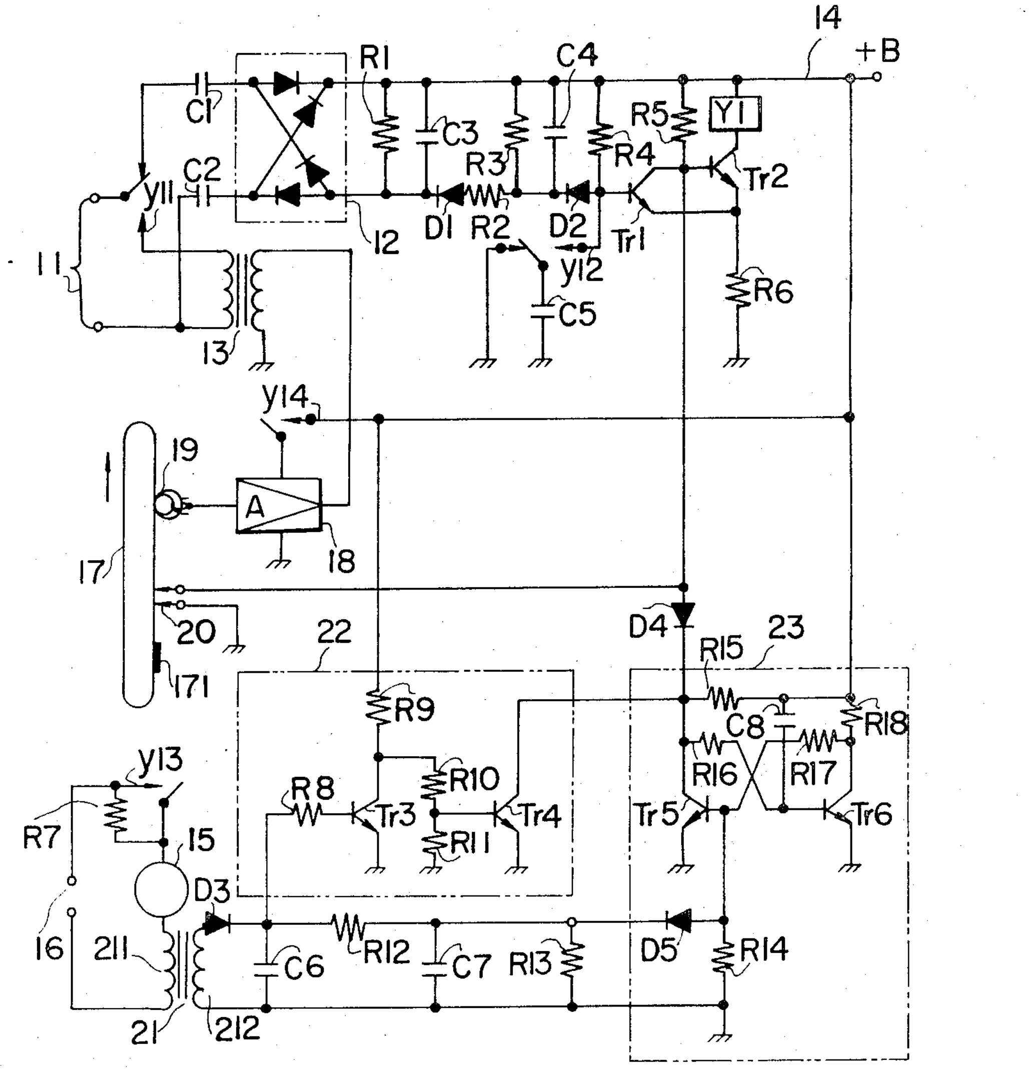
INVENTORS
AKIRA KONNO
HIROSHI MIZUNO
BY Sughrue, Rothwell, Mion, Zinn & Macpeak
ATTORNEYS

TELEPHONE AUTO-ANSWERING DEVICE

BACKGROUND OF THE INVENTION

This invention relates to a telephone auto-answering device and, more particularly, to such a device constructed so that, in the event that an electric motor, used to move the magnetic tape, is not in a normal operable condition, an automatic answering operation is prevented notwithstanding the presence of an incoming calling signal.

In response to an incoming calling signal, a conventional telephone auto-answering device operates, even if its electric motor for moving a magnetic tape is not able to rotate properly to complete a communication circuit with a telephone line to thereby occupy the telephone line unnecessarily. Further, the conventional telephone auto-answering device operates, even if an electric motor can not rotate properly due to a heavy motor load which may cause abnormal, excessive current flow in a motor coil. Under these conditions, a completed communication circuit with a telephone line results in response to an incoming calling signal to thereby occupy the telephone line unnecessarily.

SUMMARY OF THE INVENTION

Therefore, it is an object of the present invention to provide a telephone auto-answering device which does not complete a communication circuit with a telephone line in the event that a coil of an electric motor for moving a magnetic tape which has recorded thereon an answering message, is disconnected and the motor can not rotate.

It is another object of the present invention to provide a telephone auto-answering device which is constructed so that it does not respond to an incoming calling signal in the presence of abnormal excessive current flow in an electric motor for moving a magnetic tape and, thus, does not complete a communication circuit with the telephone line in response to a succeeding incoming calling signal.

According to the present invention there is provided a telephone auto-answering device which includes anelectric motor for moving a magnetic tape. Through a coil of the motor minute current, insufficient to rotate the motor, flows when the device is in a stand-by state, while rated current flows when it is desired to move the magnetic tape. A detecting circuit is provided for detecting the flow of current to cause the device to cancel and not to perform its answering operation when neither the minute current nor rated current is detected.

BRIEF DESCRIPTION OF THE DRAWING

The FIGURE is a circuit diagram of an embodiment of the present invention.

DESCRIPTION OF THE PREFERRED EMBODIMENT

In the circuit shown in the FIGURE, when a calling signal comes to connection terminals 11 to a telephone line, the calling signal passes through capacitors C1 and C2 for blocking direct current and providing an appropriate impedance to the telephone line. The signal is rectified by a rectifying circuit 12 and smoothed by a capacitor C3. Resistor R1 is a resistor for discharging an electric charge of the capacitor C3. The current smoothed by the capacitor C3 is conducted through a diode D1 and a resistor R2 into a capacitor C4 whereby the capacitor C4 is charged. Resistor R3 is a resistor for discharging the electric charge on the capacitor C4. Diodes D1 and D2 are diodes for preventing electric current from flowing backward therethrough. Transistors $Tr_1$ and $Tr_2$ and resistors R4, R5 and R6 compose one kind of the Schmitt circuit wherein the collector of the transistor $Tr_2$ is connected to a relay Y1. Parameters of the circuit elements are selected so that in a stand-by state when the device is waiting for a calling signal, transistor $Tr_1$ is in an ON state and the transistor $Tr_2$ is in an OFF state.

When a calling signal is received capacitor C4 is charged gradually. When the charge on capacitor C4 reaches a certain level, the transistor $Tr_1$ turns OFF and the transistor $Tr_2$ turns ON to thereby actuate the relay Y1. As the relay Y1 operates, its respective contacts *y*11, *y*12, *y*13 and *y*14 change from their illustrated positions to respective positions opposing the initial positions. Due to switching-over of the contact *y*11, the telephone line is connected to a matching transformer 13, thereby completing a communication circuit. When the communication circuit is complete, the calling signal stops and the charging of capacitor C4 also stops. However, since a capacitor C5, which has been discharged previously, is connected to the base of the transistor $Tr_1$ (due to switching-over of the contact *y*12) the transistor $Tr_1$ is maintained in the OFF state without interruption, so that the energized state of the relay Y1 is preserved. It will be noted that, though the base of the transistor $Tr_1$ is connected through the resistor R4 to a power line 14 (+B) at the moment of switching-over of the contact *y*12, because the diode D2 is forward biased, the base potential of $Tr_1$ is kept low and therefore transistor $Tr_1$ remains in its OFF state.

Upon switching-over of the contact *y*13 an electric motor 15 begins to rotate, causing a magnetic tape 17 on which an answering message has previously been recorded to run. Reference numeral 16 designates an alternating current power source. Resistor R7 has a large resistance value so that even in the stand-by state, minute current continues to flow therethrough. However, this current is so small as not to cause the motor 15 to rotate. Therefore, the motor 15 does not rotate in the stand-by state. Simultaneously, with the starting of motor 15, the contact *y*14 is closed and an amplifier 18 begins to operate whereby it amplifies the answering message reproduced by a magnetic head 19. The answering message, amplified to an appropriate level, is sent out through the matching transformer 13, contact *y*11 and connection terminals 11 and the telephone line to a calling party.

The magnetic tape 17 is of the endless type and, when it makes one revolution in the direction of the arrow, an electrically conductive foil 171 bonded on the tape short-circuits electrodes 20. This causes the base of transistor $Tr_2$ to assume earth potential which causes the transistor $Tr_2$ to turn OFF. The relay Y1 recovers to the initial position whereby all its contacts return to the respective positions shown in the drawing. At this time, the emitter of the transistor $Tr_2$ goes substantially to earth potential and the transistor $Tr_1$ recovers to the ON state, so that even after the electrically conductive foil 171 passes over the electrodes 20, the transistor $Tr_2$ remains in the OFF state.

It will be noted that, due to the rotational inertia of the motor 15, the magnetic tape 17 runs for a while after termination of an electric power to the motor. Thus, the conductive foil 171 stops after having passed by the electrodes 20.

Through the foregoing steps the telephone auto-answering device completes its answering operation and returns to the stand-by state to wait for a next calling signal.

Next, the operation which takes place when a coil of the motor 15 is disconnected will be described. During the stand-by state, as well as during the answering state, i.e., during the time when contact *y*13 is closed, current flows from an alternating current power source 16 through the motor into a primary winding 211 of a transformer 21. However, since the resistance of the resistor R7 is large, as described above, the value of current flowing through the resistor R7 in the stand-by state is small so that the motor 15 does not rotate. Current induced in a secondary winding 212 of the transformer 21 is rectified by a diode D3, smoothed by a capacitor C6, and, through a resistor R8 of a detecting circuit 22, applied to the base of a transistor $Tr_3$. Thus, the transistor $Tr_3$ is in the ON state and a transistor $Tr_4$ is in the OFF state.

In the event that the coil of the motor 15 is for any reason disconnected current does not flow through the primary winding 211 of the transformer 21. As a result, the base potential of the transistor $Tr_3$ drops whereby it turns OFF, and the transistor $Tr_4$ turns ON by means of its base bias current given by resistors R9, R10 and R11. Therefore, the base of the transistor $Tr_2$ receives the earth potential through a diode D4 and is maintained in its OFF state even in the presence of succeeding incoming calling signals and the relay Y1 does not operate. That is, in this manner, completion of a communication circuit with the telephone line is prevented when a motor coil is disconnected even if incoming calling signals are received.

The operation which takes place when the motor 15 is over-loaded, so that normal rotation is prevented, will now be described. In response to the abnormally heavy current flow resulting from motor over-load, excessive current, is induced in the secondary winding 212 of the transformer 21. This excessive current is rectified by the diode D3, smoothed by the capacitor C6, and, after passing through a resistor R12, applied to a Zener diode D5 of a detecting circuit 23.

When the voltage across the Zener diode D5 reaches the break down voltage of the same, the diode D5 becomes conductive and enough bias voltage is applied to the base of a transistor $Tr_5$ to turn the transistor ON. It will be noted that transistors $Tr_5$ and $Tr_6$ and resistors R15, R16, R17 and R18 compose a bistable multivibrator, and due to a speed-up capacitor C8, the transistor $Tr_6$ is normally in the ON state and the transistor $Tr_5$ is in the OFF state.

In this condition, if the transistor $Tr_5$ is made to turn ON, the transistor $Tr_6$ turns OFF and is maintained in this state even though no voltage is applied from the Zener diode D5. Due to the ON state of the transistor $Tr_5$, the base of the transistor $Tr_2$ receives the earth potential through the diode D4 and the transistor $Tr_2$ turns OFF, so that the relay Y1 recovers and, thereafter, is kept in a deenergized condition. After recovery, since the relay contacts are kept in the positions shown in the drawing, irrespective of subsequent incoming calling signals, completion of a communication circuit between the device and the telephone line is prevented.

Further, there may occur a transient phenomenon at the moment the motor is started during normal operation such that heavy current flows in the motor coil. However, since the voltage induced in the secondary winding 212 at that moment is absorbed by the capacitor C7, this transient phenomenon can not be detected by the detecting circuit 23.

It should be noted that the diode D4 is connected in circuit so that a pulse can be applied to the transistor $Tr_2$ in the event that the electrodes are short-circuited during the normal operation but the bistable multivibrator of the detecting circuit 23 is prevented from turning over.

As described hereinabove, the telephone auto-answering device constructed in accordance with the present invention detects disconnection of the coil of the motor for moving the magnetic tape when it occurs to recover to its stand-by state, and does not perform the answering operation even if a succeeding calling signal incomes thereafter whereby the telephone line is not occupied unnecessarily. Further, the present telephone auto-answering device detects heavy current flowing in the motor to recover to the stand-by state, and does not perform its answering operation irrespective of incoming of a calling signal thereafter, whereby the telephone is not occupied unnecessarily.

The illustrated embodiment is the so-called answer-only telephone auto-answering device which sends an answering message to a calling party and thereafter completes its answering operation. However, this invention is, of course, applicable to a telephone auto-answering device of the type in which it can record a message from the calling party.

While one preferred embodiment of the invention has been described hereinabove, it is appreciated that variations and modifications may be made by one skilled in the art without departing from the spirit and scope of the invention.

What is claimed is:

1. A telephone auto-answering device including an electric motor for moving a magnetic tape when the device is placed in an answering state comprising:
   - a detecting means, including a Zener diode, for detecting abnormal excessive current flowing in a coil of said electric motor when the device is in an answering state;
   - first switching circuit means, including a bistable multivibrator, for performing a switching operation in response to detection of the excessive current by said detecting means; and
   - circuit means for completing a communication circuit between the device and a telephone line, said circuit means including second circuit switching means responsive to said first switching circuit means for causing said circuit means to be inoperative on the detection of excessive current; said circuit means further comprising relay means energized in response to the switching of said second switching circuit means in the presence of a calling signal to cause completion of the communication circuit, detection of an excessive current causing the switching of said second switching circuit means to de-energize said relay means and prevent further switching of said second switching means in the presence of subsequent calling signals.

2. The device of claim 1 further including means for preventing switching of said second switching circuit means upon detection of an excessive transient current pulse resulting from normal motor starting.

3. A telephone auto-answering device of the type in which in response to an incoming calling signal from a calling party said device completes a communication circuit between the device and a telephone line, and said device including an electric motor for moving a magnetic tape with an answering message recorded thereon, said device comprising: means for causing a minute current insufficient to rotate the motor, to flow in a coil of the motor when the device is in its standby state, means for causing rated current to flow when the device is in the answering state, first detecting circuit means for detecting the absence of said minute current, second detecting circuit means for detecting the flow of current exceeding said rated current, and switching circuit means responsive to the outputs of said first and second detecting circuit means for causing said defice to remain in its standby state when no minute current is detected, and to return to the standby state when said device is in an answering state and to prevent said device from responding to a subsequent incoming calling signal when heavy current exceeding said rated current is flowing through said coil.

* * * * *